United States Patent [19]

Okawa et al.

[11] Patent Number: 4,670,409

[45] Date of Patent: Jun. 2, 1987

[54] DIELECTRIC CERAMIC MATERIAL

[75] Inventors: Takashi Okawa, Kokubu; Nobuo Yokoe, Hayato, both of Japan

[73] Assignee: Kyocera Corporation, Kyoto, Japan

[21] Appl. No.: 802,036

[22] Filed: Nov. 26, 1985

[30] Foreign Application Priority Data

Nov. 27, 1984 [JP] Japan .............................. 59-251323

[51] Int. Cl.$^4$ ............................................. C04B 35/46
[52] U.S. Cl. ...................................... 501/135; 501/136
[58] Field of Search ................................ 501/135, 136

[56] References Cited

U.S. PATENT DOCUMENTS

| 3,431,124 | 3/1969 | Hayashi et al. | 501/136 |
| 4,242,213 | 12/1980 | Tamura et al. | 501/136 OR |
| 4,357,426 | 11/1982 | Murata et al. | 501/136 X |
| 4,468,471 | 8/1984 | Kashima et al. | 501/135 |

FOREIGN PATENT DOCUMENTS 50-58600  5/1975  Japan .................................. 501/136

Primary Examiner—William R. Dixon, Jr.
Assistant Examiner—Karl Group
Attorney, Agent, or Firm—Spensley Horn Jubas & Lubitz

[57] ABSTRACT

Disclosed is a dielectric ceramic material comprising lanthanum magnesiumtitanate having a perovskite structure. The lanthanum magnesiumtitanate is preferably used in the form of a composition of the lanthanum magnesiumtitanate and calcium titanate as the dielectric ceramic material. The dielectric ceramic material has a small dielectric loss and a large dielectric constant, and the temperature coefficient of the resonance frequency can be controlled to a small value within a certain range. This dielectric material is valuable as a microwave resonator.

6 Claims, 3 Drawing Figures

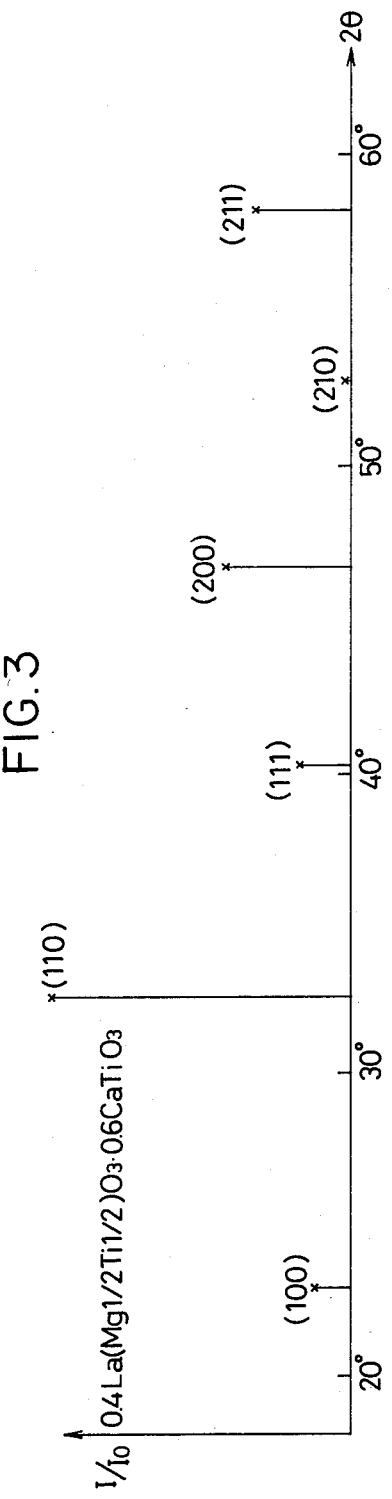

DIELECTRIC CERAMIC MATERIAL

BACKGROUND OF THE INVENTION

1. Field of the Invention

The present invention relates to a dielectric ceramic material. More particularly, the present invention relates to a dielectric resonator comprising a perovskite type compound having a novel chemical composition, which is especially valuable as a dielectric resonator to be used in the microwave region.

2. Description of the Prior Art

Recently, dielectric ceramic materials are widely used in the microwave region with practical application of car telephones and personal wireless installations, conversion of microwave circuits to integrated circuits and application to gun oscillators. These microwave dielectric ceramics are mainly used for resonators, and the properties required for resonators are as follows. Namely, (1) since the wavelength is shortened to $1/\sqrt{\epsilon}$ ($\epsilon$ stands for the dielectric constant), the dielectric constant should be large so as to satisfy the requirement of reduction of the size, (2) the dielectric loss at a high frequency should be small, and (3) the change of the resonance frequency according to the temperature, that is, the temperature dependency of the dielectric constant, should be small and stable.

As the known dielectric ceramic material of this type, there can be mentioned a material of the $BaO-TiO_2$ system, a material of the $REO-BAO-TiO_2$ system (RE stands for a rare earth element) and a material of the $(BaSrCa)(ZrTi)O_3$ system.

The material of the $BaO-TiO_2$ system has a dielectric constant $\epsilon r$ is as high as 38 to 40 and the dielectric loss $\tan \delta$ is less than $2.00 \times 10^{-4}$, but a single phase material having a temperature coefficient $\tau f$ of 0 can hardly be obtained and the changes of the dielectric constant and the temperature dependency of the dielectric constant according to the change of the composition are great. Accordingly, it is difficult to control the temperature coefficient ($\tau f$) of the resonance frequency at a low level stably while maintaining a high dielectric constant and a low dielectric loss. In case of the material of the $REO-BaO-TiO_2$ system, the dielectric constant $\epsilon r$ is very high and 40 to 60 and a product in which the temperature coefficient $\tau f$ of the resonance frequency is 0 can be obtained, but the dielectric loss $\tan \delta$ is large and exceeds $5.0 \times 10^{-4}$. In the material of the $(BaSrCa)(ZrTi)O_3$ system, the dielectric loss $\tan \delta$ is small and less than $2.00 \times 10^{-4}$ and the dielectric constant $\epsilon r$ is appropriate, but the deviation of the temperature coefficient $\tau f$ of the resonance frequency is great and it is difficult to obtain products having constant properties stably. Incidentally, the dielectric loss $\tan \delta$ referred to in the instant specification is the value measured at 500 to 600 MHz by using a di-entrant resonator. As is seen from the foregoing description, a composition capable of completely satisfying the above-mentioned requirements for the microwave dielectric material has not been developed.

SUMMARY OF THE INVENTION

We found that lanthanum magnesiumtitanate having a perovskite structure and a dielectric ceramic material consisting of a solid solution having a specific composition comprising this compound and calcium titanate have the above-mentioned three properties required for the microwave dielectric material.

According to the present invention, there is provided a dielectric ceramic composition for microwaves, which has a relatively high dielectric constant and a dielectric loss maintained at a low level and also has a small and stable temperature dependency of the dielectric constant. Accordingly, the temperature dependency of the resonance frequency of a dielectric resonator formed by using the dielectric ceramic composition of the present invention is small and stable.

In accordance with one fundamental aspect of the present invention, there is provided a dielectric ceramic material comprising lanthanum magnesiumtitanate having a perovskite structure.

In accordance with another aspect of the present invention, there is provided a dielectric ceramic material comprising a composition comprising lanthanum magnesiumtitanate and calcium titanate and having a perovskite structure.

BRIEF DESCRIPTION OF THE DRAWINGS

Chart 1 shows a Cu-K$\alpha$ X-ray diffraction pattern of lanthanum magnesiumtitanate according to the present invention.

Chart 2 shows a Cu-K$\alpha$ X-ray diffraction pattern of a solid solution comprising 80 mole % of lanthanum magnesiumtitanate and 20 mole % of calcium titanate according to the present invention.

Figure 1:
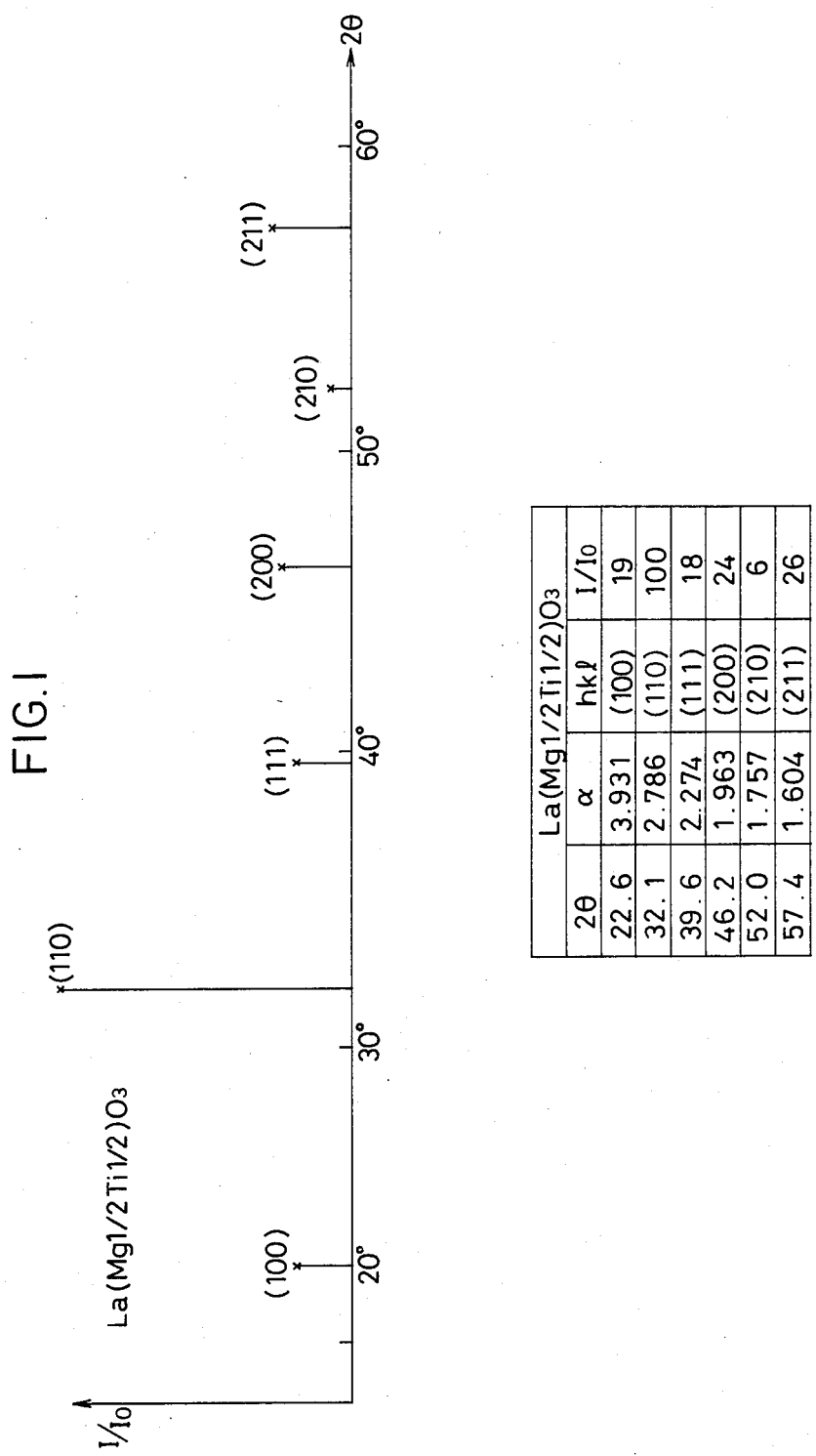
Figure 2:
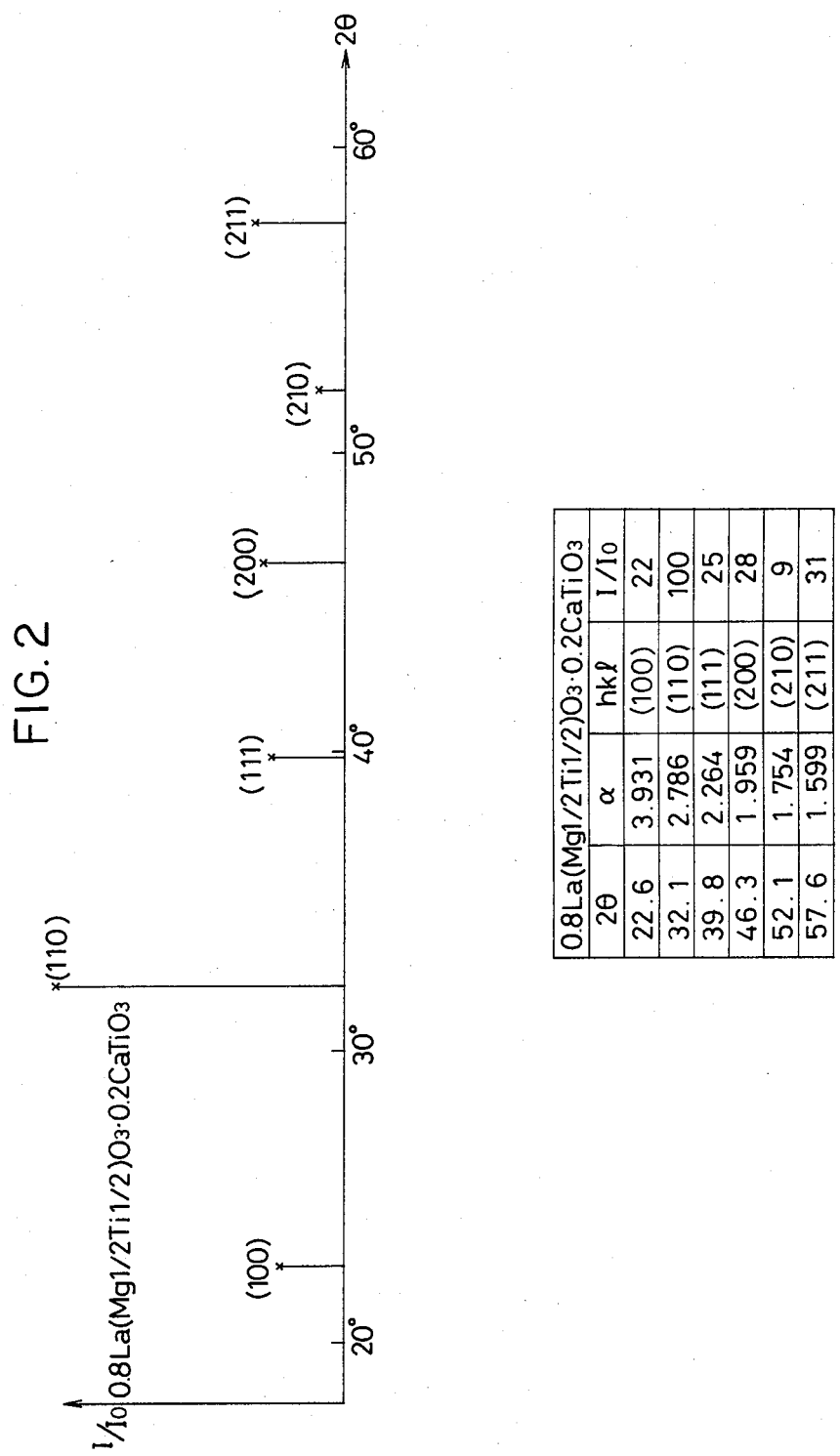

Chart 3 shows a Cu-K$\alpha$ X-ray diffraction pattern of a solid solution comprising 40 mole % of lanthanum magnesiumtitanate and 60 mole % of calcium titanate according to the present invention.

DETAILED DESCRIPTION OF THE PREFERRED EMBODIMENTS

The dielectric ceramic material of the present invention is characterized in that it comprises lanthanum magnesiumtitanate having a perovskite structure. An oxide having a perovskite structure has a composition represented by the following general formula:

$$ABO_3 \qquad (1)$$

wherein A and B are such metals that the sum of valencies of both the metals are +6.

In the strontium nickelniobate used in the present invention, the element A is lanthanum and the element B consists of a combination of magnesium (II) and titanium (IV). Ideally, the lanthanum magnesiumtitanate has a chemical composition represented by the following formula:

$$La(Mg_{\frac{1}{2}}Ti_{\frac{1}{2}})O_3 \qquad (2)$$

Of course, the ratios of La, Mg and Ti may be deviated from the range represented by the formula (2) to some extent, so far as the lanthanum magnesiumtitanate has a perovskite structure.

Chart 1 shows a Cu-K$\alpha$ X-ray diffraction pattern of the above-mentioned lanthanum magnesiumtitanate, and from this Chart 1, it will be understood that the lanthanum magnesiumtitanate has a perovskite structure.

In the present invention, a dielectric ceramic material can be formed solely of lanthanum magnesiumtitanate. Furthermore, a composition comprising lanthanum magnesiumtitanate and calcium titanate and having a perovskite structure may be used for formation of a dielectric ceramic material.

Lanthanum magnesiumtitanate having a perovskite structure is characterized in that the dielectric loss tan δ is low and $1.66 \times 10^{-4}$, but the dielectric constant εr is relatively small and 32 and the temperature coefficient (τf) is relatively large at $-88.3$ ppm/°C. When calcium titanate is incorporated in lanthanum magnesiumtitanate, the dielectric constant εr is monotonically increased with increase of the molar ratio of calcium titanate and the temperature coefficient can be controlled to a small value. In order to control the dielectic loss to a small value and control the temperature coefficient τf (ppm/°C.) of the resonance frequency to a relatively small value, it is preferred that barium titanate be present in an amount of up to 70 mole % based on the dielectric composition.

Charts 2 and 3 show a Cu-Kα X-ray diffraction pattern of a lanthanum magnesiumtitanate/calcium titanate according to the present invention. From these Chart, it will be understood that also these compositions have a perovskite structure. These compositions are in the form of a solid solution comprising calcium titanate solid-dissolved in the crystal phase of lanthanum magnesiumtitanate.

The dielectric material of this type according to the present invention has a chemical composition represented by the following formula:

$(1-x)La(Mg_{\frac{1}{2}}Ti_{\frac{1}{2}})O_3 \cdot xCaTiO_3$    (3)

wherein x is a positive number of up to 0.7.

If the value of x is 0.3 to 0.65, a dielectric ceramic material having a temperature coefficient smaller than ±50 ppm/°C. is preferably provided.

In a high-frequency dielectric material to be used for a duplexer such as a personal wireless installation, it is preferred that the temperature frequency (τf) of the resonance frequency be in the range of $|\tau f| \leq 20$, and in order to control the temperature coefficient τf of the resonator frequency within this preferred range, it is preferred that the value x in the formula (3) be in the range of from 0.47 to 0.59.

The dielectric ceramic material of the present invention can be obtained by mixing lanthanum carbonate, magnesium oxide and titanium oxide at the above-mentioned composition ratio, pulverizing the mixture according to the dry or wet method, calcining the mixture at a temperature of 1100° to 1400° C. for 1 to 4 hours, shaping the calcined mixture into an optional form and sintering the molded body at a temperature of 1400° to 1700° C. to produce a perovskite structure, though the applicable process is not limited to this process. If calcium carbonate and an additional amount of titanium oxide are mixed in addition to the above ingredients at the above-mentioned composition ratio and the mixture is treated in the same manner as described above, a composition of the solid solution type can be obtained.

The material of the present invention can be used for various microwave dielectric ceramic articles and this especially valuably used for a resonator.

The material of the present invention completely satisfies the above-mentioned three requirements for microwave dielectric materials. Namely, the material of the present invention is characterized in that (1) the dielectric constant εr is relatively high at about 32 to about 62, (2) the dielectric loss tan δ is very small and $1.66 \times 10^{-4}$ to $3.01 \times 10^{-4}$, and (3) by changing the value x of the composition formula, the temperature coefficient f can be controlled within a range of $-88.3$ to $+77.5$ ppm/°C. However, if the value x exceeds 0.7, the specific inductive capacity is increased, but the temperature coefficient τf is extremely shifted to the positive side. If the composition ratio of $La_2O_3$, MgO, $TiO_2$ and CaO is deviated from the range represented by the composition formula of $(1-x)La(Mg_{\frac{1}{2}}Ti_{\frac{1}{2}})O_3 \cdot xCaTiO_3$, and the above-mentioned excellent dielectric properties are degraded.

The present invention will now be described in detail with reference to the following example that by no means limits the scope of the invention.

EXAMPLE

High-purity lanthanum oxide ($La_2O_3$), magnesium oxide (MgO), titanium oxide ($TiO_2$) and calcium carbonate ($CaCO_3$) were weighed so that the composition value x was as shown in Table 1 and they were wet-mixed overnight by using agate balls. The mixture was dried and calcined at 1300° C. for 2 hours, and a binder was added in an amount of about 1% by weight and the mixture was granulated. The obtained powder was molded under a pressure of about 800 kg/cm² and the molded body was sintered in air at a temperature of 1400° to 1700° C. for 2 hours.

The dielectric constant, dielectric loss and the temperature coefficient of the resonance frequency were measured at 500 to 600 MHz with respect to each sample by using a di-entant resonator.

The obtained results are shown in Table 1.

TABLE 1

| Sample No. | Composition (value x) | Dielectric Constant (εr) | Dielectric Loss (tan δ) | Temperature Coefficient τf (ppm/°C.) |
|---|---|---|---|---|
| 1 | 0 | 32.0 | $1.66 \times 10^{-4}$ | $-88.3$ |
| 2 | 0.05 | 32.4 | $2.54 \times 10^{-4}$ | $-82.9$ |
| 3 | 0.20 | 334. | $1.90 \times 10^{-4}$ | $-61.1$ |
| 4 | 0.30 | 36.1 | $2.02 \times 10^{-4}$ | $-49.2$ |
| 5 | 0.45 | 41.7 | $2.22 \times 10^{-4}$ | $-26.3$ |
| 6 | 0.50 | 44.6 | $2.49 \times 10^{-4}$ | $-15.7$ |
| 7 | 0.55 | 47.6 | $2.80 \times 10^{-4}$ | $+0.6$ |
| 8 | 0.58 | 49.8 | $2.77 \times 10^{-4}$ | $+15.3$ |
| 9 | 0.60 | 50.9 | $3.01 \times 10^{-4}$ | $+20.3$ |
| 10 | 0.65 | 56.2 | $2.83 \times 10^{-4}$ | $+47.3$ |
| 11 | 0.70 | 62.1 | $2.98 \times 10^{-4}$ | $+77.5$ |
| 12 | 0.80 | 77.5 | $3.16 \times 10^{-4}$ | $+176.5$ |

Each of samples 1 through 11 shown in Table 1 is a composition represented by the formula $(1-x)La(Mg_{\frac{1}{2}}Ti_{\frac{1}{2}}) \cdot xCaTiO_3$ $(0 \leq X \leq 0.7)$ of the present invention, and the temperature coefficient τf (ppm/°C.) is controlled according to the present invention. On the other hand, sample 12 is outside the scope of the present invention because x is 0.8.

In each of samples 1 through 11, the dielectric constant ($\epsilon r$) is relatively high and 32 to 62 and the dielectric loss (tan $\delta$) is very small and $1.66\times10^{-4}$ to $3.01\times10^{-4}$. Furthermore, by changing the value x of the composition formula, the temperature coefficient ($\tau f$) of the resonance frequency can be controlled within a range of from $-88.3$ to $+77.5$.

In sample 12 where x is 0.8, the dielectric constant is large, but the temperature coefficient $\tau f$ is increasd to the positive side and is $+176.5$. Accordingly, sample 12 is not practically applicable.

As is apparent from the foregoing description, the dielectric ceramic material of the present invention having a composition represented by the formula $(1-x)$-La(Mg$_{\frac{1}{2}}$Ti$_{\frac{1}{2}}$)-xCaTiO$_3$ ($0 \leq X \leq 0.7$) and a perovskite crystal structure has all of the following three characteristics required for high-frequency dielectric ceramic materials; that is, (1) the dielectric constant ($\epsilon r$) is relatively high, (2) the dielectric loss is small, and (3) the temperature dependency of the resonance frequency can be easily controlled.

We claim:

1. A dielectric ceramic material consisting essentially of lanthanum magnesiumtitanate represented by the following formula:

$$La(Mg_{\frac{1}{2}}Ti_{\frac{1}{2}})O_3$$

wherein said dielectric ceramic material has a perovskite structure.

2. A dielectric ceramic material consisting essentially of a solid solution of lanthanum magnesiumtitanate and calcium titanate represented by the following formula:

$$(1-x)La(Mg_{\frac{1}{2}}Ti_{\frac{1}{2}})O_3 \cdot xCaTiO_3$$

wherein x is a positive number of up to 0.7 and said dielectric ceramic material has a perovskite structure.

3. A dielectric ceramic material as set forth in claim 2, wherein x is a positive number of from 0.3 to 0.65.

4. A dielectric ceramic material as set forth in claim 2, wherein x is a positive number of from 0.47 to 0.59.

5. A microwave resonator composed of a dielectric ceramic material as set forth in claim 1.

6. A microwave resonator composed of a dielectric ceramic material as set forth in claim 2.

* * * * *